(12) United States Patent
Stus

(10) Patent No.: US 11,878,666 B2
(45) Date of Patent: Jan. 23, 2024

(54) BRAKE DE-ICING AGENT INSERTION APPARATUS FOR AN AIR LINE OF A VEHICLE

(71) Applicant: Milton Industries, Inc., Chicago, IL (US)

(72) Inventor: Karolina Stus, Chicago, IL (US)

(73) Assignee: MILTON INDUSTRIES, INC., Chicago, IL (US)

(*) Notice: Subject to any disclaimer, the term of this patent is extended or adjusted under 35 U.S.C. 154(b) by 93 days.

(21) Appl. No.: 17/052,325

(22) PCT Filed: Jun. 28, 2019

(86) PCT No.: PCT/US2019/039877
§ 371 (c)(1),
(2) Date: Nov. 2, 2020

(87) PCT Pub. No.: WO2020/263276
PCT Pub. Date: Dec. 30, 2020

(65) Prior Publication Data
US 2023/0174039 A1    Jun. 8, 2023

(51) Int. Cl.
*B60T 17/00* (2006.01)
(52) U.S. Cl.
CPC .................. *B60T 17/006* (2013.01)
(58) Field of Classification Search
CPC .............................. B60T 17/00; B60T 17/006
See application file for complete search history.

(56) References Cited

U.S. PATENT DOCUMENTS

| | | | | |
|---|---|---|---|---|
| 2,670,082 A * | 2/1954 | Dunn | ..................... | F02M 25/00 210/90 |
| 2,670,130 A * | 2/1954 | Bloxsom | ................. | B60T 17/02 137/154 |
| 2,828,772 A * | 4/1958 | Landis | .................. | B60T 17/006 261/62 |
| 4,804,013 A * | 2/1989 | Wilson | .................. | B60T 17/006 303/1 |
| 5,009,246 A * | 4/1991 | Giles | ...................... | B60T 17/006 137/205.5 |
| 5,293,904 A * | 3/1994 | Wood | .................... | B60T 17/006 62/82 |
| 7,981,194 B2 * | 7/2011 | Hoffman | .............. | B01D 53/261 96/138 |
| 9,506,604 B2 * | 11/2016 | Allen | ........................ | F17D 1/00 |

(Continued)

FOREIGN PATENT DOCUMENTS

GB          2174923 A  * 11/1986  ............ B60T 17/006

*Primary Examiner* — Timothy L Maust
(74) *Attorney, Agent, or Firm* — Justin Lampel

(57) ABSTRACT

A brake de-icing agent insertion apparatus for an air line of a vehicle is provided. Preferably, the de-icing is the emergency brake line of a truck or other vehicle. The brake de-icing agent insertion apparatus has a release valve plug located on the underside of a main storage reservoir. An extended rim on the underside of the main storage reservoir surrounds the release valve plug and provides a stabilizing surface for resting the reservoir. Further the extended rim provides a protective shield should there be a release of the de-icing agent which might be pressurized and might otherwise spray on, contact and harm a person adding the de-icing agent to the air line.

6 Claims, 7 Drawing Sheets

(56) References Cited

U.S. PATENT DOCUMENTS

| | | | | |
|---|---|---|---|---|
| 2003/0230341 A1* | 12/2003 | Burford | ............... | F04B 41/02 |
| | | | | 137/203 |
| 2014/0020776 A1* | 1/2014 | Allen | ............... | B60T 13/00 |
| | | | | 137/602 |
| 2021/0323530 A1* | 10/2021 | Macon | ............... | B60T 7/20 |

* cited by examiner

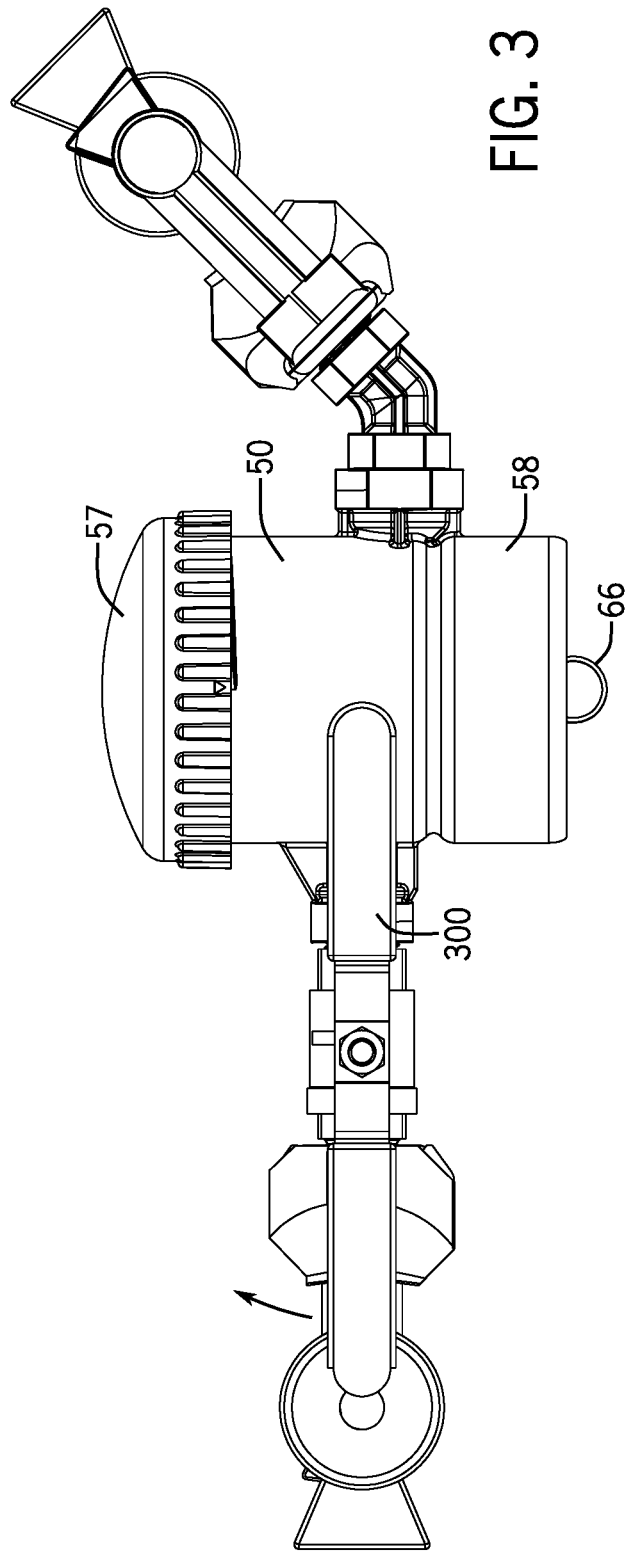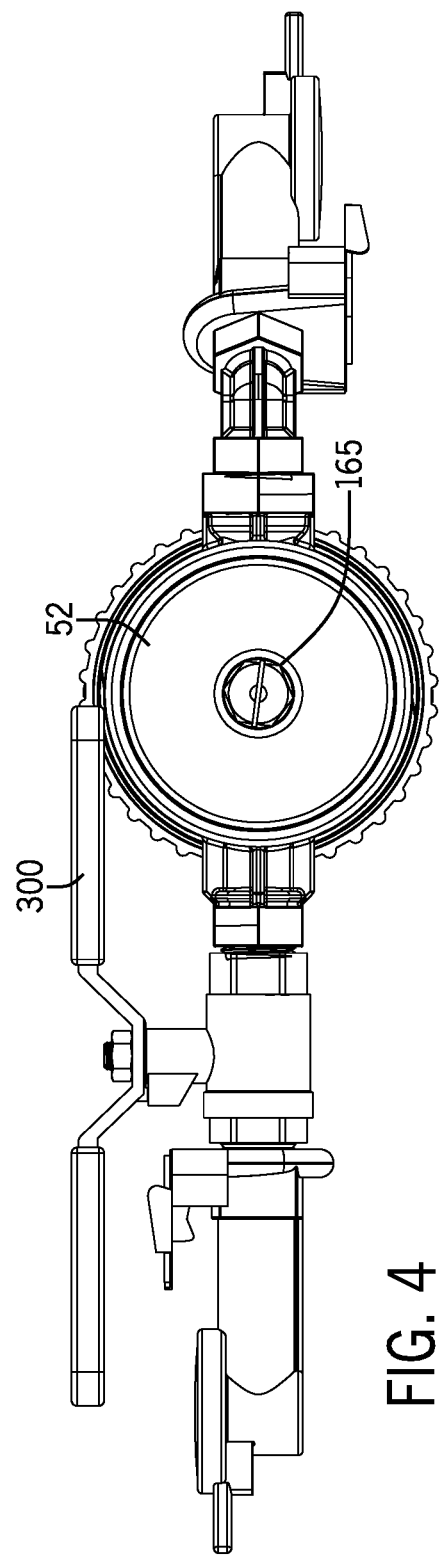

BRAKE DE-ICING AGENT INSERTION APPARATUS FOR AN AIR LINE OF A VEHICLE

BACKGROUND OF THE INVENTION

A brake de-icing agent insertion apparatus for an air line of a vehicle is provided. Preferably, the air line is the emergency brake line of a truck or other vehicle. The brake de-icing agent insertion apparatus has a release valve plug located on the underside of a main storage reservoir. An extended rim on the underside of the main storage reservoir surrounds the release valve plug and provides a stabilizing surface for resting the reservoir. Further the extended rim provides a protective shield should there be a release of the de-icing agent which might be pressurized and might otherwise spray on, contact and harm a person adding the de-icing agent to the air line.

Brake de-icing agent insertion apparatuses for air lines are known. For example, U.S. No.: 9,506,604 to Allen discloses a fluid agent (such as a de-icing agent) into the air line of a trailer of a tractor trailer. The device comprises a canister defining an upwardly opening chamber, a lid removably securable to the canister to close the chamber, an inlet tube extending from the canister and having a connector at an end of the inlet tube, a valve in said inlet tube; and an outlet tube extending from the canister and having a connector at an end of the inlet tube. The outlet tube is shaped and sized such that the canister chamber can be filled with the liquid agent from the ground and without the need to climb on the chassis of the trailer tractor.

Further, U.S. Pat. No. 7,089,976 to Bargy discloses a device for adding solvent to a pneumatic system comprises an inlet structure to receive solvent from a supply and a reservoir to hold solvent from the inlet structure. An outlet structure, which is in fluid communication with the reservoir, is designed to connect the reservoir to a pneumatic system. A first stop valve is disposed between the inlet structure and the reservoir, and a second stop valve is disposed between the reservoir and the outlet structure.

Still further, U.S. Publication No.: 20090095367 to Socha discloses a de-icing assembly is used for unblocking a trailer brake line. The trailer brake line includes a receiving end that is connected to a truck end of a truck brake line. The de-icing assembly includes a housing including an interior space for storing an alcohol fluid. The housing also defines a top surface and a bottom surface. An inlet extends through the top surface. The inlet is removably connectable to the truck end of the truck brake line. The de-icing outlet also includes an outlet that is removably connectable to the receiving end of the trailer brake line. The outlet includes a fluid tube extending to a distal end disposed adjacent the bottom surface of the housing such that pressurized air received in the housing from the inlet forces the alcohol fluid stored in the housing out the outlet and into the trailer brake line to unblock the trailer brake line.

However, these patents and published documents fail to describe a brake de-icing agent insertion apparatus for an air line of a vehicle which is easy to use. Further, these patents and publications fail to provide for a brake de-icing agent insertion apparatus for an air line of a vehicle which allows a de-icing agent to be safely inserted into an air line.

SUMMARY OF THE INVENTION

A brake de-icing agent insertion apparatus for an air line of a vehicle is provided. Preferably, the air line is the emergency brake line of a truck or other vehicle. The brake de-icing agent insertion apparatus has a release valve plug located on the underside of a main storage reservoir. An extended rim on the underside of the main storage reservoir surrounds the release valve plug and provides a stabilizing surface for resting the reservoir. Further the extended rim provides a protective shield should there be a release of the de-icing agent which might be pressurized and might otherwise spray on, contact and harm a person adding the de-icing agent to the air line.

An advantage of the present brake de-icing agent insertion apparatus for an air line of a vehicle is that the present brake de-icing agent insertion apparatus for an air line of a vehicle has a release valve plug on the underside of the main storage reservoir.

Still another advantage of the present brake de-icing agent insertion apparatus for an air line of a vehicle is that the present brake de-icing agent insertion apparatus for an air line of a vehicle is safe to use.

Yet another advantage of the present brake de-icing agent insertion apparatus for an air line of a vehicle is that the present brake de-icing agent insertion apparatus for an air line of a vehicle may easily be stabilized on a catwalk on the back of a tractor in, for example, cold weather conditions.

For a more complete understanding of the above listed features and advantages of the present brake de-icing agent insertion apparatus for an air line of a vehicle, reference should be made to the detailed description and the drawings. Further, additional features and advantages of the invention are described in, and will be apparent from, the detailed description of the preferred embodiments.

BRIEF DESCRIPTION OF THE DRAWINGS

FIG. 3 illustrates a side view of the brake de-icing agent insertion apparatus for an air line.

FIG. 4 illustrates a bottom plan view of the brake de-icing agent insertion apparatus for an air line.

DETAILED DESCRIPTION OF THE PREFERRED EMBODIMENTS

A brake de-icing agent insertion apparatus for an air line of a vehicle is provided. Preferably, the air line is the emergency brake line of a truck or other vehicle. The brake de-icing agent insertion apparatus has a release valve plug located on the underside of a main storage reservoir. An extended rim on the underside of the main storage reservoir surrounds the release valve plug and provides a stabilizing surface for resting the reservoir. Further the extended rim provides a protective shield should there be a release of the de-icing agent which might be pressurized and might otherwise spray on, contact and harm a person adding the de-icing agent to the air line.

Figure 6:
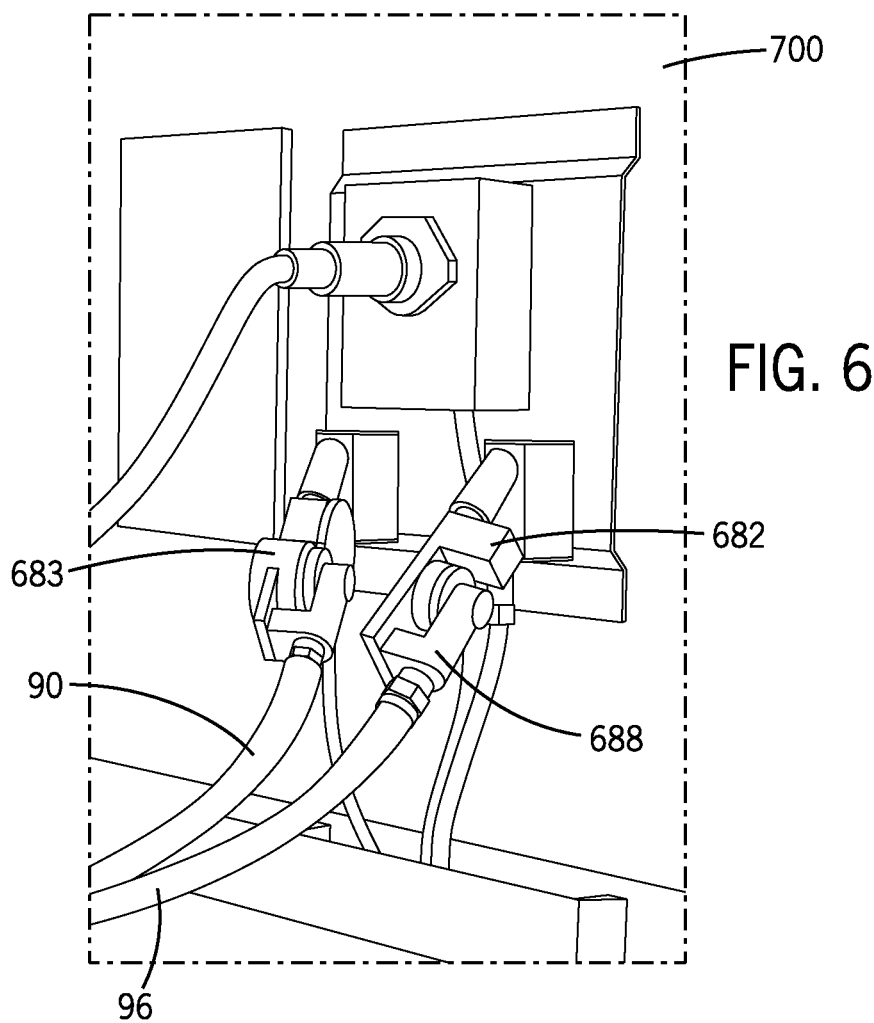
FIG. 6 illustrates an air line (or 'brake line') of a vehicle during normal use without the apparatus installed.
Figure 9:
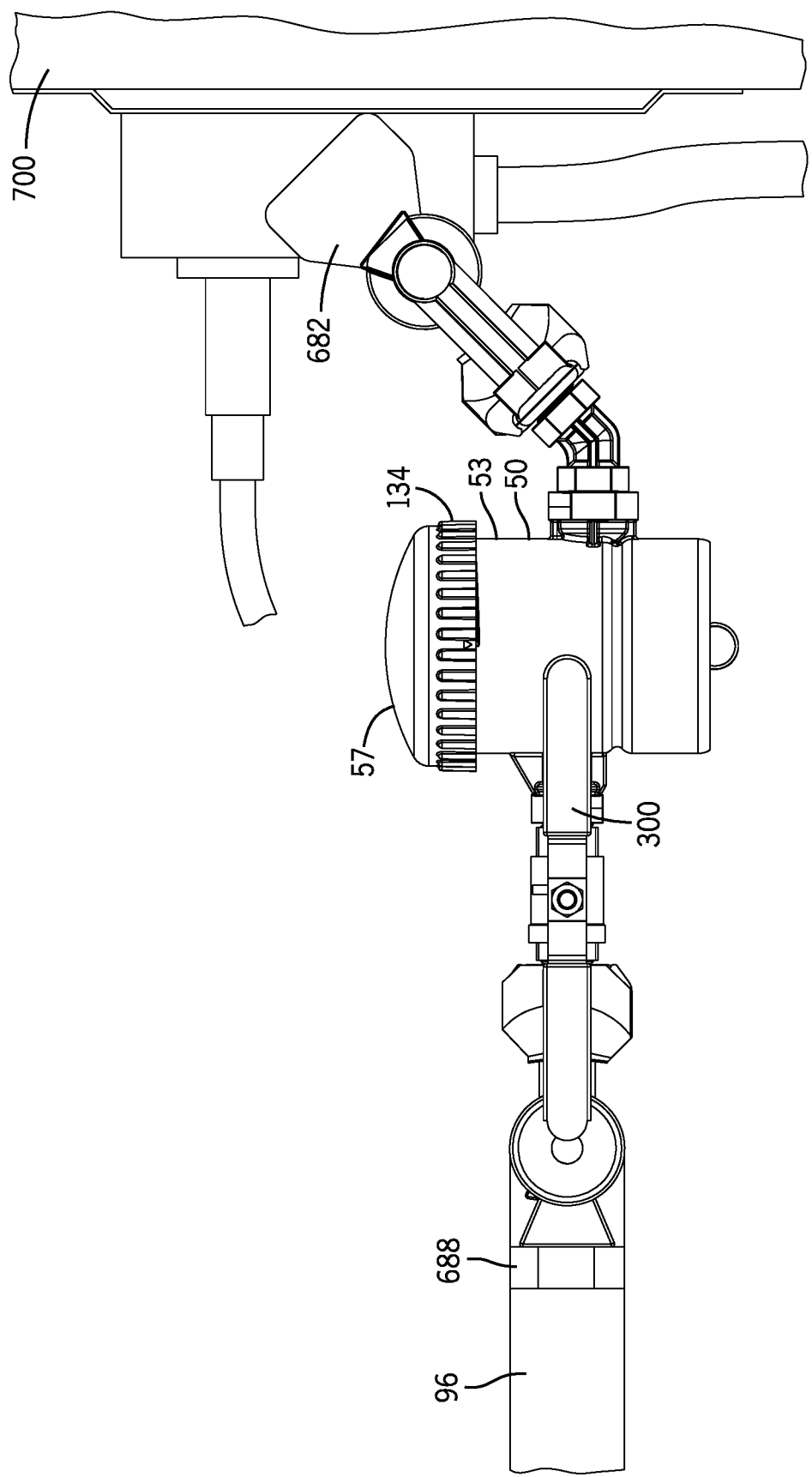
FIG. 9 illustrates the apparatus properly attached to a vehicle during use.

In an embodiment a brake de-icing agent insertion apparatus 1 for an air line system (FIG. 6) is provided. Although this application generally states that the brake de-icing agent is inserted into the 'air lines', it should also be noted that the de-icing agent may be introduced to the brake valves as well via the present apparatus 1. Typically, the air lines 90 and 96 (generally for the brakes of a vehicle) do not have the brake de-icing insertion apparatus 1 in place while the vehicle is moving and, instead, the emergency air line 96 is directly connected to the trailer 700 of a vehicle as shown in FIG. 6. Only during a freeze, for example by ice crystals, or other restrictions of the emergency air line 682 (or 'brake lines') is the emergency air line 96 of FIG. 6 disconnected and the present brake de-icing agent insertion apparatus 1 added to the air line as shown in FIG. 9.

The present brake de-icing agent insertion apparatus 1 is preferably made of a durable material such as, for example, metal and/or plastic. The brake de-icing agent insertion apparatus 1 is especially suitable for introducing a de-icing agent 500 (FIG. 5) within the emergency air line 96 of a trailer of a tractor trailer or other vehicle so that the de-icing agent 500 may be used to unfreeze the emergency air line 96 of the trailer of a tractor trailer or other vehicle.

Figure 5:
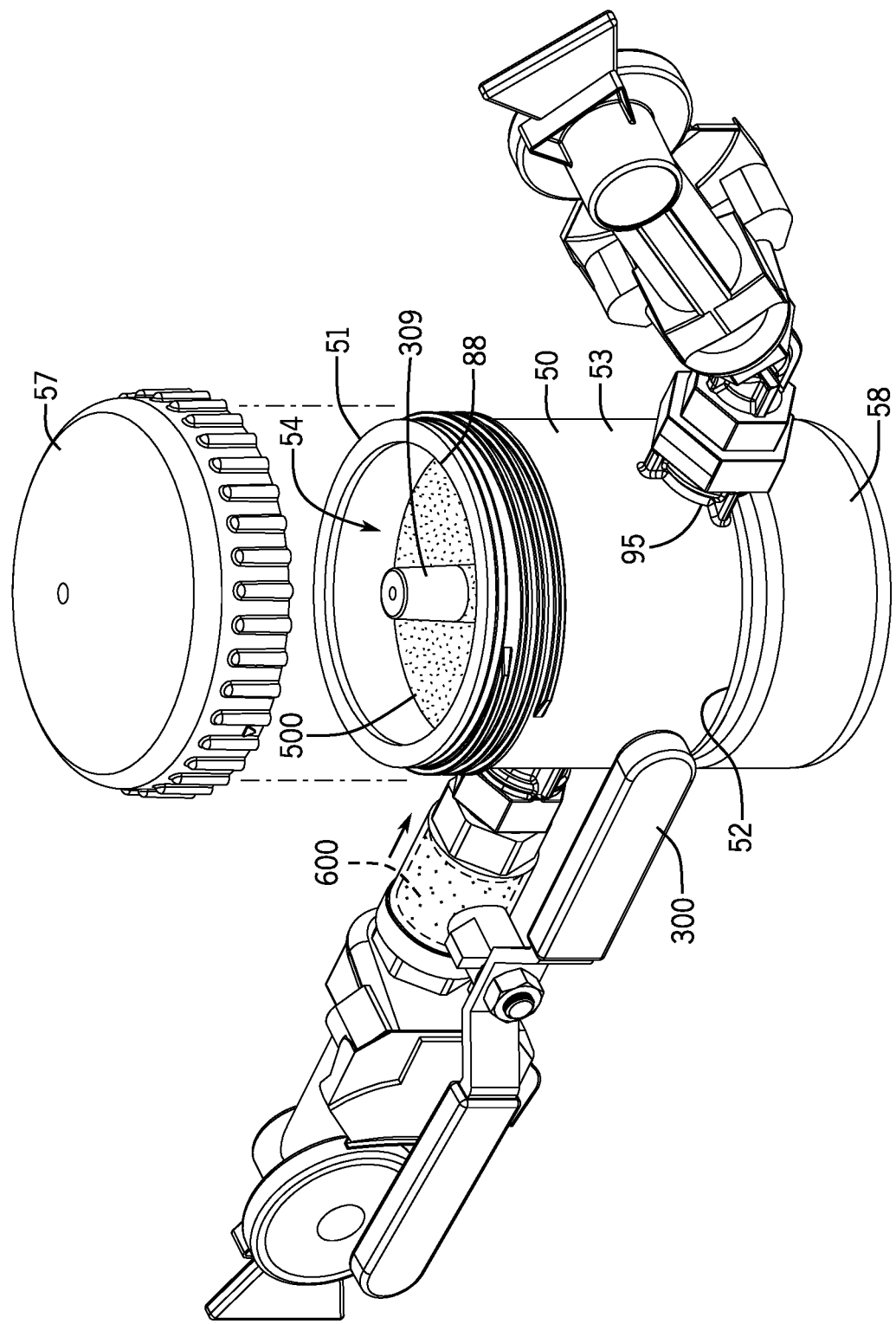
FIG. 5 illustrates a top perspective view of the brake de-icing agent insertion apparatus for an air line of a vehicle wherein the cap of the main storage reservoir is removed and wherein the de-icing agent is visible within the reservoir.

In an embodiment, the apparatus 1 may have a main storage reservoir 50 for storing the de-icing agent 500. The main storage reservoir 50 may have a top 51 (FIG. 5), a bottom 52, a side 53 and a generally hollow interior 54 (FIG. 5) which houses a vertical breather tube 309 (FIG. 5). The vertical breather tube 309 may allow the relief release valve 165 of the plug 65 to depressurize after use without spraying de-icing agent 500 on an individual. Attached to the main storage reservoir 50 may be an inlet connection line 660 (which may be rigid in an embodiment) and an outlet connection line 670 (which may be rigid in an embodiment). At the distal end of the inlet connection line 660 may be an inlet port 681. On the distal end of the outlet connection line 670 may be an outlet port 680. In one embodiment, the outlet connection line 670 is angled upward to make an easier connection to the emergency line port 682 of FIG. 6 when the apparatus 1 is being used. In particular, the outlet connection line 670 may be angled upward with respect to the inlet connection line 660 so that the two lines 660, 670 are not at a one hundred and eighty degree axis line with respect to one another. Further, the inlet connection line 660 and outlet connection line 670 being in fluid communication with the storage reservoir 50 via openings on the side of the storage reservoir 50.

Figure 7:
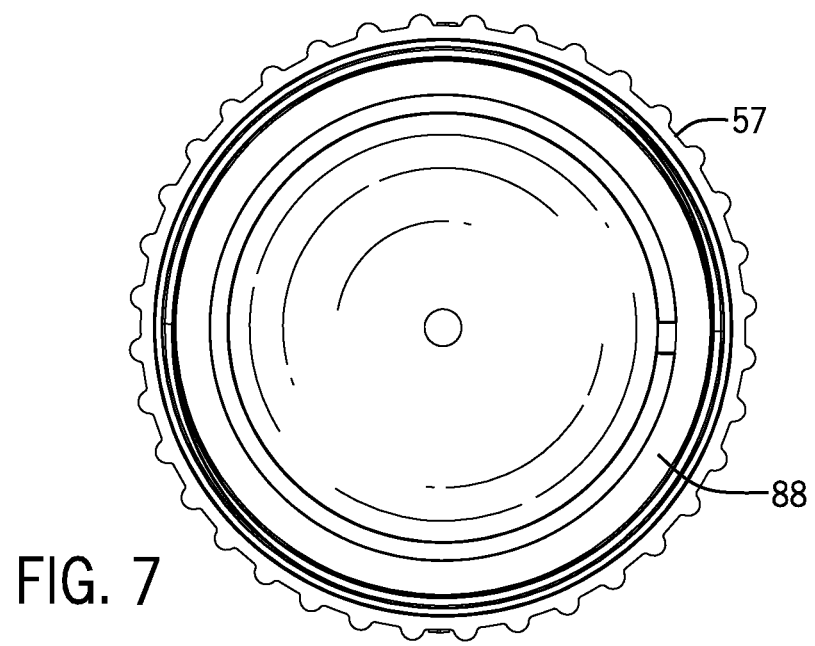
FIG. 7 shows the underside of the cap of the main storage reservoir wherein a gasket is visible.

The generally hollow interior 54 of the main storage reservoir 50 temporarily stores the de-icing agent 500. The illustrations show the main storage reservoir 50 as being round; however, alternative shapes may be utilized. In an embodiment, a removable cap 57 may be temporarily secured to the top 51 of the main storage reservoir to prevent the de-icing agent 500 from exiting the main storage reservoir 50 through the top 51 during use. Securing the cap 57 to the main storage reservoir 50 is required if the apparatus 1 is being used in the pressurized and preferred embodiment; however, a user may leave the cap 57 off if the user is just pouring the de-icing agent 500 into the air line without using pressurized air. A gasket 88 on the underside of the cap 57 (as shown in FIG. 7) of the main storage reservoir 50 may create an air and/or liquid tight seal between the cap 57 and the top 51 of the main storage reservoir 50 during use.

Further, in an embodiment, the cap 57 may have a ridged edge surface 134 so as to allow for a more secure grip to secure or remove the cap 57 from the reservoir 50.

Figure 2:
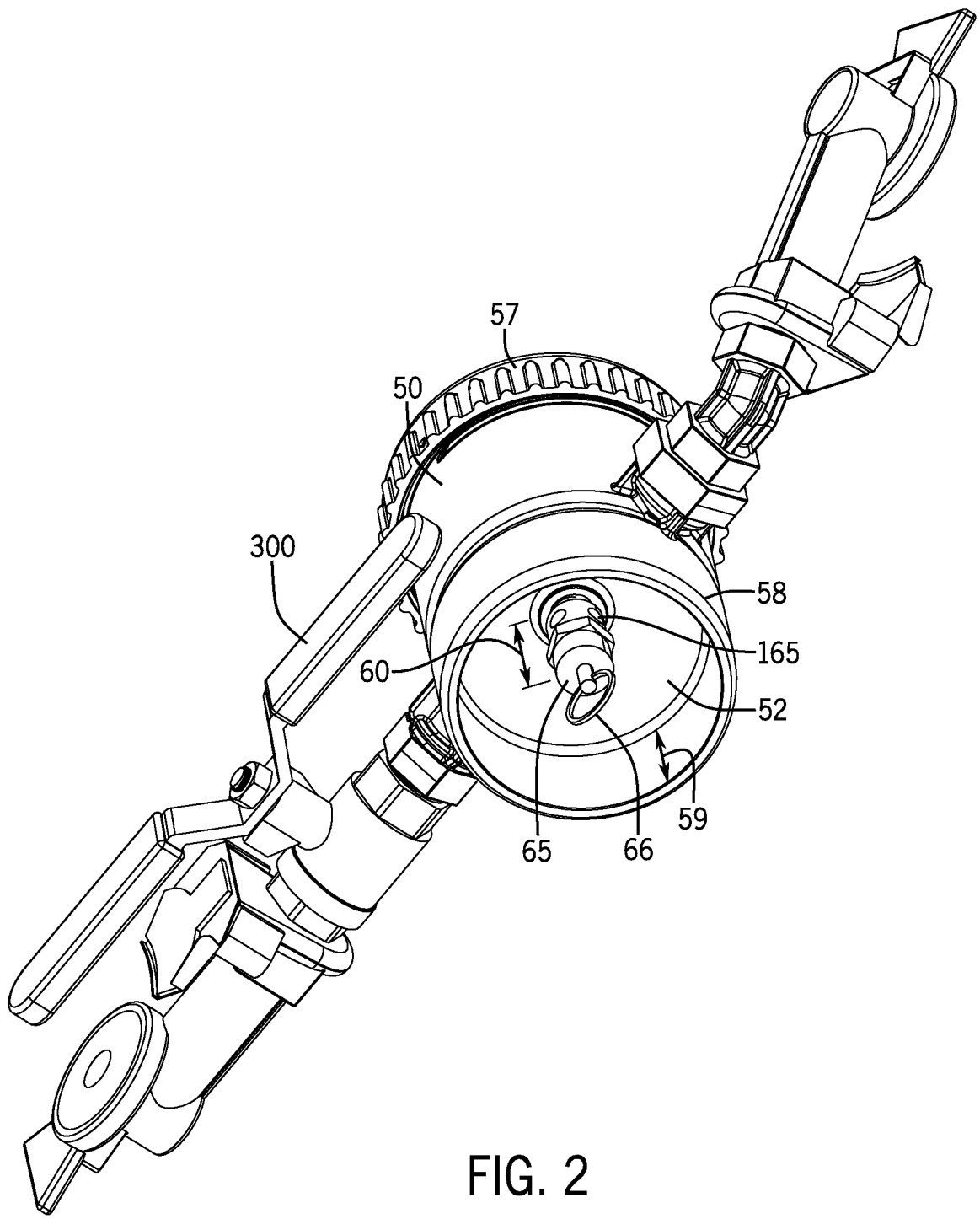
FIG. 2 illustrates a perspective view of the underside of the main storage reservoir of the brake de-icing agent insertion apparatus in one embodiment.

Referring now to FIG. 2, in an embodiment, the bottom 52 of the main storage reservoir 50 may have an extended rim 58 which extends below the bottom surface 52 of the storage reservoir 50. The extended rim 58 may have a length 59 which is, in one embodiment, greater than a length 60 of a plug 65 which is secured to the underside (or bottom) 52 of the main storage reservoir 50. As a result of the length 59 of the extended rim 58 being longer than the plug 65, liquid and/or gas released release valve 165 (which is selectively movable between an open and closed position) will spray on the inner surface of the extended rim 58 and not on a person, therein preventing injury.

Figure 8:
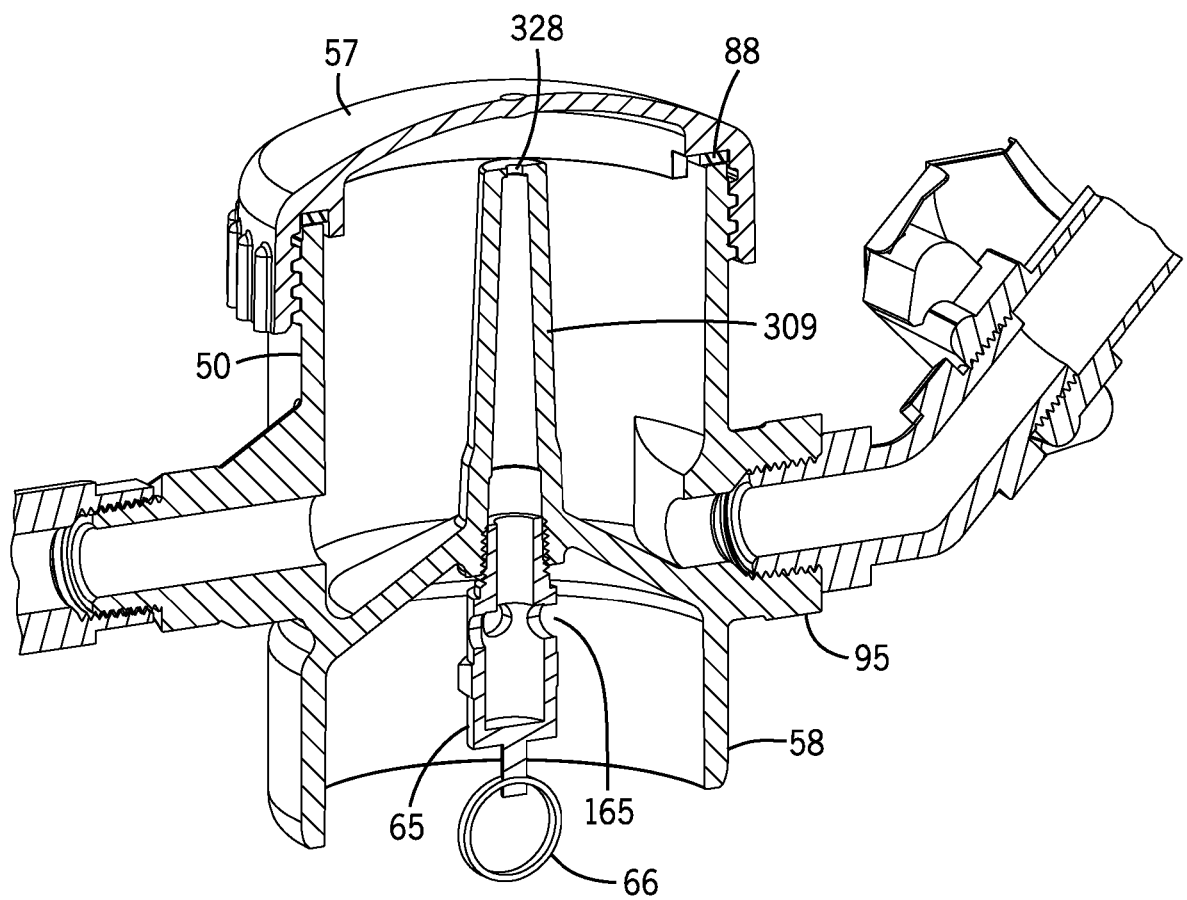
FIG. 8 illustrates a cross section of the main storage reservoir wherein the vertical breather tube is easily visible.

The plug 65 may have a release ring 66. When the release ring 66 is pulled in a direction away from the bottom 52 of the main storage reservoir 50 a release valve 165 on the plug 65 of the main reservoir 50 may release pressure from within the interior 54 of the main storage reservoir 50 by passing through an opening 328 (FIG. 8) at the top of the vertical breather tube 309 and out the plug 65. The extended rim 58 may act as a slash guard when the pressure is released from the release valve 165 of the plug 65. In particular, liquid and or gas may be expelled from the release valve 165 at high velocity and may contact the inner side of the extended rim 58 as opposed to striking a person as would otherwise happen in prior de-icing devices.

Figure 1:
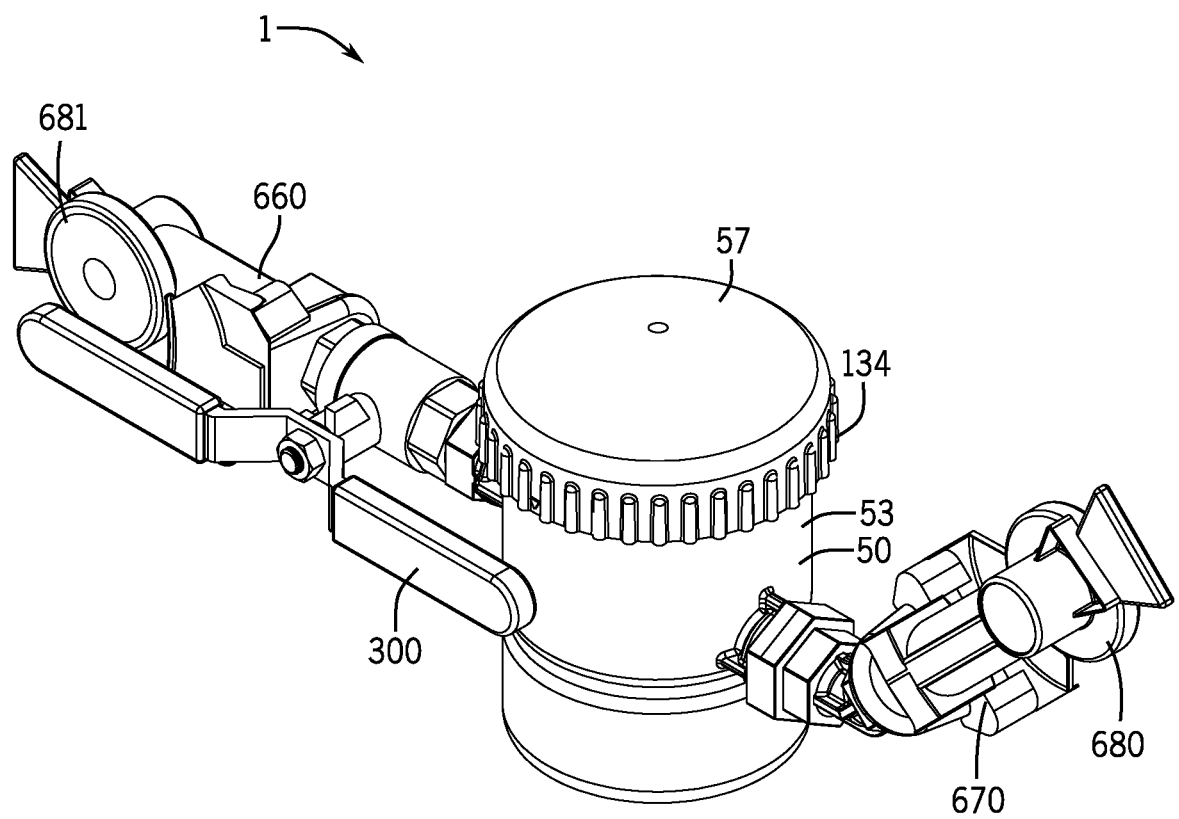
FIG. 1 illustrates a perspective view of the brake de-icing agent insertion apparatus for an air line of a vehicle.

Referring now to FIG. 6, to use the apparatus 1, the emergency air line 96 going to the trailer 700 of the vehicle is first disconnected from the emergency air port 682 of the trailer 700. The outlet port 680 of the apparatus 1 is then directly attached to the emergency air port 682 of the trailer 700 of a vehicle and the emergency supply line connector port 688 (attached to the hose itself) of the emergency air line 96 is then attached to the inlet port 681 (FIG. 1) of the apparatus 1 so that the apparatus 1 now is located in the middle of and connects the emergency air line 96 to the emergency air port of 682 of the trailer 700, as shown in FIG. 9. The service line 90 remains directly connected, and still attached to the service port 683 of the trailer 700 of a vehicle during use.

The cap 57 is then removed from the main storage reservoir 50 and de-icing agent 500 is introduced to the interior 54 of the main storage reservoir 50. The cap 57 is then placed back on the main storage reservoir 50 and the cap 57 tightened and secured to provide an air and liquid tight seal within the reservoir 50. The emergency air of the vehicle 96 is then activated in the cabin of the vehicle, forcing compressed air/gas 600 (FIG. 5), to force the de-icing agent 500 from the interior 54 of the main storage reservoir 50 into the emergency air port 682 (and therefore through the brake line so that the de-icing agent 500 may act on ice crystals within the brake line) of the trailer 700 of a vehicle. The de-icing agent 500 may then unfreeze the brake line of the trailer 700. Once finished, the emergency air line 96 is reattached to the emergency air port 682 of the trailer 700 and the apparatus 1 stored for future use.

After use, the apparatus 1 should be removed from the emergency line 96 and the emergency air line 96 reconnected to the trailer 700 of the vehicle, as shown in FIG. 6. Failure to remove the apparatus 1 from the emergency air line 96 may cause a jack-knifing of the vehicle if the apparatus 1 becomes disconnected or fails, causing the rear brakes lock up.

Further, to prevent accidental driveaways, the relief valve plug 65 is set such that proper driving pressures of the brake line cannot be reached if the apparatus 1 is still connected (as in FIG. 9). In particular, normal operating brake pressure for a tractor/trailer in the US is about 120 PSI. In Canada, the normal operating brake pressure is usually higher, around 145 PSI. The relief valve plug 65 of the present apparatus is set between 70 and 85 PSI, which means that if the apparatus 1 is left attached to the line (like in FIG. 9) and the tractor tries to build pressure so that the driver can drive away, the relief valve plug 65 would bleed off the excess air and not allow the PSI to reach 120 PSI or 145 PSI. That would typically cause a "low air" alarm to go off in the cab to alert the driver of the low pressure. As a result, the driver would receive multiple alarms if attempting to drive off with the apparatus 1 attached to the trailer 700.

Further, failure to remove the pressure within the emergency air line 96 and main reservoir 50 prior to removal of the apparatus 1 from the emergency air line 96 may result in de-icing agent 500 exiting the main storage reservoir 50 with high velocity which may cause injury to a person. A cut-off valve 300 (FIG. 1) is first activated to stop the pressurized gas/air 600 from entering the main reservoir 50. Even after the cut-off valve 300 is activated, some pressure remains in the main reservoir 50 and must be properly vented via the release valve 165 of the plug 65. Prior art de-icing agent introduction apparatuses typically have a vent along the outlet port 95 or 670, not the underside of a main reservoir. The present apparatus and system 1 provides for a pressure release below the main reservoir 50 for safety reasons.

Providing for the pressure release (via the release valve 165 of the plug 65) on the bottom 52 of the main reservoir 50, as opposed to along the outlet connection line 670, as is common in prior art de-icing insertion apparatuses, therein directs pressurized de-icing agent 500 to exit the system directed downward, away from a person and therein protects the safety of the person.

Although embodiments of the invention are shown and described therein, it should be understood that various changes and modifications to the presently preferred embodiments will be apparent to those skilled in the art. Such changes and modifications may be made without departing from the spirit and scope of the invention and without diminishing its attendant advantages.

I claim:

1. A brake de-icing agent insertion apparatus for an air line of a vehicle or vehicle trailer comprising:
    a storage reservoir having a top having an opening, a bottom, a side, and an interior;
    a cap removably and selectively secured to the top of the storage reservoir;
    an inlet connection line connected to the storage reservoir wherein the inlet connection line is in fluid communication with the storage reservoir;
    an outlet connection line connected to the storage reservoir wherein the outlet connection line is in fluid communication with the storage reservoir;
    an extended rim located on the bottom of the storage reservoir wherein the extended rim extends below the bottom of the storage reservoir;
    wherein the bottom of the extended rim of the storage reservoir directly contacts a resting surface and stabilizes the storage reservoir on the resting surface;
    wherein the extended rim has a uniform length and wherein the uniform length is greater than a length of a pressure release valve which is located under the bottom of the storage reservoir and wherein an interior surface of the extended rim acts as a safety shield against a liquid and/or a gas which exits the pressure release valve; and
    wherein the pressure release valve is selectively movable between an open and closed position.

2. The brake de-icing agent insertion apparatus for an air line of a vehicle or vehicle trailer of claim 1 further comprising:
    a pressure release valve located under the bottom of the storage reservoir wherein the pressure release valve is selectively movable between an open and closed position.

3. The brake de-icing agent insertion apparatus for an air line of a vehicle or vehicle trailer of claim 1 further comprising:
    a gasket located on an underside of the cap of the storage reservoir wherein the gasket provides an air-tight and liquid-tight seal with the storage reservoir when the cap is inserted onto the storage reservoir.

4. The brake de-icing agent insertion apparatus for an air line of a vehicle or vehicle trailer of claim 1 wherein the apparatus is removably insertable in the air line of a tractor trailer of a vehicle.

5. The brake de-icing agent insertion apparatus for an air line of a vehicle or vehicle trailer of claim 1 wherein the outlet connection line is at a non-linear angle with respect to the inlet connection line.

6. The brake de-icing agent insertion apparatus for an air line of a vehicle or vehicle trailer of claim 2 further comprising:
    a pull release pin connected to the pressure release valve.

* * * * *